United States Patent
Hanawa et al.

[11] Patent Number: 5,810,129
[45] Date of Patent: Sep. 22, 1998

[54] ROTARY DAMPER

[75] Inventors: Nobumichi Hanawa, Kani; Kozo Yamamoto, Kan; Toshihiro Yamada, Gifu-ken, all of Japan

[73] Assignee: Kayaba Kogyo Kabushiki Kaisha, Tokyo, Japan

[21] Appl. No.: 733,295

[22] Filed: Oct. 17, 1996

[30] Foreign Application Priority Data

| Oct. 19, 1995 | [JP] | Japan | 7-296271 |
| Jan. 31, 1996 | [JP] | Japan | 8-037342 |
| Mar. 15, 1996 | [JP] | Japan | 8-087654 |

[51] Int. Cl.$^6$ ........................................ F16F 9/14
[52] U.S. Cl. ................................. 188/308; 188/297
[58] Field of Search ................. 188/308, 306, 188/307, 296, 295, 290, 297

[56] References Cited

U.S. PATENT DOCUMENTS

| 2,028,164 | 1/1936 | Peo | 188/308 |
| 2,038,533 | 4/1936 | Bliss et al. | 188/308 X |
| 2,678,115 | 5/1954 | Loe | 188/308 X |

FOREIGN PATENT DOCUMENTS

| 766508 | 6/1934 | France | 188/308 |
| 769305 | 8/1934 | France | 188/308 |

*Primary Examiner*—Peter M. Poon
*Attorney, Agent, or Firm*—McGlew and Tuttle

[57] ABSTRACT

A rotary damper for stabilization of a damping and temperature characteristic without impairing a temperature compensation function and facilitates a lubricating operation. The damper includes a bore for a damping force generating mechanism as a single communication flowpassage and a bore for a temperature compensation mechanism arranged in a line in a casing. The damping force generating mechanism is divided into two sets of damping elements with damping valves and return valves, arranged in series in the communication flowpassage with back surfaces of the damping valves and are oppositely positioned. A portion of the communication flowpassage between the damping valves is communicated with an oil chamber of a temperature compensation mechanism by an oil passage. A side panel is provided with a lubricating port toward the oil chamber of the temperature compensation mechanism. A side oil passage branched from the lubricating port is communicated with one end of the communication flowpassage, and the lubricating port and the side oil passage are simultaneously opened and closed by a cut plug. Seal members fitted in vanes and separating blocks are provided with concave portions for forming projecting lips on the inner and outer peripheral surfaces thereof. The concave portion at an angular portion on the outer peripheral surface is buried to form a flat surface, or the concave portion is formed to be shallow, to lower the height of the projecting lip, and the rigidity in that portion is increased to enhance the wear resistance.

14 Claims, 6 Drawing Sheets

ROTARY DAMPER

FIELD OF THE INVENTION

This invention relates to a rotary damper for performing a damping function making use of a rotational motion, and in particular relates to an improvement in a rotary damper which is suitable for use with, for example, a suspension of an automobile, a suspension for a rear wheel of a motor-bike or other apparatuses.

BACKGROUND OF THE INVENTION

A rotary damper of this kind, is presently known and disclosed in Japanese Patent Application Laid-Open No. 158680/1995 previously proposed by the present applicant.

The rotary damper previously proposed as described above uses a casing having two separating blocks arranged with a phase difference of 180 degrees on the inner wall surface thereof, and a rotor provided with two vanes which radially extend with a phase difference of 180 degrees from the outer peripheral surface thereof. The rotor is rotatably inserted into the casing.

On each of the separating blocks a seal member is fitted for sealing a joining surface between an inner wall surface of the casing and an outer peripheral surface of the rotor from an extreme end to both sides. Also a seal member is fitted for sealing a joining surface between the inner wall surfaces of the casing from the extreme end to both sides of the vane.

The separating blocks and the vanes having the seal members cooperate with each other by positioning the rotor in the casing in a manner to divide and interior of the casing into two alternate sets of operating oil chambers, which alternately repeats the contraction and expansion as the relative rotational motion of the casing and the rotor takes place.

On the other hand, the casing is bored with three bores in parallel and adjacent to the two sets of operating oil chambers, the bores at opposite ends having ends on the same side and in communication with each other through the central bore.

The aforementioned bores at opposite ends are formed as a series of communication flowpassages which turn back in opposite directions from the middle toward the axial direction. Within each of the bores are juxtaposed, in the same direction, damping force generating mechanisms having a damping channel provided with a damping valve and a free channel having a return valve in the opposite direction. The central bore is formed as a temperature compensation mechanism for absorbing the contraction and expansion of a volume of operating oil as temperature of the oil changes.

Further, the ends of the bores at opposite ends form the communication flowpassage and are separately in communication with two sets of operating oil chambers on the casing side by an oil passage bored through the casing.

With this, the operating oil extruded from the operating oil chamber on the contraction side, as the relative rotational motion of the casing and the rotor takes place, flows from the damping channel of one damping force generating mechanism by the communication flowpassage with a damping valve forcibly opened, and then flows into the operating oil chamber on the expansion side with a return valve of the free channel in the other damping force generating mechanism opened while inverting the direction of the flow.

Moreover, the flow of the above-described operating oil flows through the oil chamber of the temperature compensation mechanism in the process from the damping channel of one damping force generating mechanism toward the free channel of the other damping force generating mechanism.

Thus, one damping force generating mechanism imparts a flow resistance to the operating oil flowing through the damping channel to generate a fixed damping force, and changes in volume of operating oil caused by temperature changes are compensated for in a manner such that the operating oil having flowed through the damping channel of one damping force generating mechanism passes through the oil chamber of the temperature compensation mechanism in the process in which the operating oil moves toward the free channel of the other damping force generating mechanism.

As described above, in the aforementioned rotary damper, the damping force generating mechanisms for generating the damping force according to the rotational direction of the rotary damper are arranged in parallel on the opposed portions of the pair of communication flowpassages which turn back in the opposite direction from the middle toward the axial direction, and the oil chamber of the temperature compensation mechanism is communicated with the communication flowpassage between the damping force generating mechanisms.

To this end, it is necessary that the casing is bored with two bores for arranging the damping force generating mechanisms and a bore for the temperature compensation mechanism, amounting to three bores. It is also necessary to arrange the bore for the temperature compensation mechanism at a position between two bores for the communication flowpassage.

The necessity of these three bores results in a larger size of the casing, a larger size of the rotary damper itself to increase a weight thereof, and an adverse influence on the fuel consumption of the vehicle. In addition, a disadvantageous increase in manufacturing cost of the rotary damper, and a difficulty in mounting the rotary damper on the vehicle is caused.

For stably securing the damping characteristic generated by the damping force generating mechanism, it is necessary to keep the operating oil pressure applied to the oil chamber of the temperature compensation mechanism as low as possible so that the temperature compensation mechanism is not operated, and does not produce a decrease of the operating oil supplied to the operating oil chamber on the expansion side. The reason for this is that a decrease of operating oil supplied to the operating oil chamber on the expansion side results in a disturbance of the initial damping characteristic in the next inverting operation of the rotary damper.

In the rotary damper, all the flow of the operating oil having passed through the damping channel of one damping force generating mechanism, flows into the free channel of the other damping force generating mechanism through the oil chamber of the temperature compensation mechanism. Therefore, it is necessary to increase an area of the oil passage for communicating the ends of three bores each other. It unavoidably requires an increase in effort to form these oil passages which increases the cost.

In addition, in the lubricating operation after assembly of the rotary damper, it is necessary to remove the plug to inject the operating oil into the oil chamber of the temperature compensation mechanism and at the same time, the operating oil chambers and necessary parts are filled with the operating oil through the free channel of the damping force generating mechanism.

In this case, the free channel of the damping force generating mechanism is closed by the return valve so as to allow only the reverse flow of the operating oil to the damping channel. Thus, the return valve should be forcibly opened to forcibly introduce the operating oil into the operating oil chamber. The flow resistance applied to the flow of the operating oil causes the lubricating operation to take a long time, and this lowers the manufacture efficiency and unavoidably increase the cost.

In addition, the seal members disposed on the separating blocks and the vanes are often formed with a plurality of projecting lips in parallel with the sealing surface in order to enhance the sealing performance. In assembling, an appropriate interference is imparted to the projecting lips to secure the sealing performance of the seal members.

As a result, at the angular portion of the seal member between the extreme end and at both sides, the projecting lips are subjected to force resulting from interference from both the extreme end and both sides, so that the surface pressure at the portion is locally high.

Therefore, not only in the seal member on the side of the separating block in which only the extreme end is a sliding contact surface but also in the seal member on the side of the vane in which the extreme end and the outer peripheral surfaces of both legs are a sliding contact surface, is the abrasion at the angular portion large compared with that at other portions. This impairs the durability of the entire seal member.

On the other hand, in the case where the projecting lips are formed to be lower and the sealing performance is secured by elastic deformation of the body portion of the seal member, the projecting lips collapse due to the elastic deformation of the seal member resulting from the interference and the pressure of the operating oil. This increases the friction during the operation of the rotary damper to adversely affect on the operatability.

Further, even though the seal member is generally formed of a material such as rubber which is rich in elasticity, when the temperature of the operating oil rises as the operation of the damper takes place, the rigidity lowers and the seal member tends to be deformed due to the pressure of the operating oil, as a result of which the sealing performance at a high temperature is deteriorated.

SUMMARY AND OBJECTS OF THE INVENTION

This invention has been achieved in view of the various circumstances as described above. It is an object of present the invention to provide a small rotary damper which is light in weight, is easily manufactured and is inexpensive without impairing the generated damping characteristic and the temperature compensation function.

It is a further object of the present invention to provide a rotary damper provided with a new lubricating mechanism capable of performing the lubricating operation to the rotary damper easily and efficiently.

It is another object of the present invention to provide a rotary damper provided with a new seal member capable of securing the wear resistance and the sealing performance at a high temperature of seal members for sealing outer peripheral surfaces of a separating block and a vane to always secure the stable damping characteristic.

For achieving the aforesaid objects in the present invention, a bore for a damping force generating mechanism and a bore for a temperature compensation mechanism as a single communication flowpassage are arranged in a line on a casing, and the damping force generating mechanism is divided into two sets of damping force generating elements comprising a damping channel provided with a damping valve and a free channel provided with a return valve.

The damping force generating elements are arranged in series in a communication flowpassage with the back surfaces of the damping valves being oppositely fitted in one or individual guide rod, and a portion of the communication flowpassage between the damping valves is in communication with a temperature compensation mechanism by an oil passage to constitute a rotary damper.

With the above-described construction, two bores comprising a bore for a communication flowpassage accommodating therein a damping force generating mechanism and a bore forming a temperature compensation mechanism are arranged in parallel, and the middle of the bore for a communication flowpassage is in communication with an oil chamber of the temperature compensation mechanism by an oil passage bored in the casing. With this, it is possible to compensate for changes in volume of an operating oil as a temperature changes by the temperature compensation mechanism while maintaining a fixed damping characteristic by the damping force generating mechanism.

As a result, the generated damping characteristic by the damping force generating mechanism and the original function of the temperature compensation mechanism are not impaired, and the casing is merely provided with two bores, i.e., the bore for a communication flowpassage accommodating therein the damping force generating mechanism and the bore constituting the temperature compensation mechanism.

Accordingly, the casing is small in size, light in weight, easy to manufacture and less in cost, whereby the entire rotary damper may be small in size, light in weight, easy in fabrication, and less in cost.

Further, in addition, a lubricating port is provided toward the oil chamber of the temperature compensation mechanism from the outside, and a side oil passage branched from the lubricating port is also communicated with the communication flowpassage. The lubricating port and the side oil passage are closed by a single closing cut plug.

With this, during the lubricating operation, the cut plug is removed to simultaneously open the side oil passage with the lubricating port so that the operating oil is injected into the oil chamber of the temperature compensation mechanism and the communication flowpassage through the lubricating port and the side oil passage.

Then, the operating oil injected into the oil chamber and the communication flowpassage flows into the respective operating oil chambers and necessary parts from both the oil chamber and the communication flowpassage to fill the rotary damper with the operating oil.

Upon completion of the lubricating operation, when the lubricating port is closed by the cut plug, the side oil passage is also closed at the same time, whereby the lubricating operation of the operating oil can be done easily and in a short period of time, and in addition, the damping channels of the damping force generating mechanisms are in communication with the oil chamber of the temperature compensation mechanism.

Bypass flowpassages are provided which individually bypass the damping channels of the damping force generating mechanisms to the other operating oil chamber, and damping force adjusting mechanisms capable of being adjusted from outside are disposed, thereby enabling further convenience of the rotary damper while stabilizing the damping force characteristic and the temperature characteristic and individually adjusting the damping force characteristic according to the operating direction.

Moreover, in addition, the seal member provided on the separating block and the vane is formed such that only the angular portion subjected to an interference from both the extreme end and both legs comprises a flat surface or such that the projecting lips are lowered than other portions.

Thereby, in the seal member, the angular portion thereof comes in contact with the mating surface with an area larger than other portions, rarely adversely affecting on the operation of the rotary damper.

With this, the seal member is suppressed in an increase of local surface pressure of the angular portion to reduce the abrasion, thus not only enhancing the durability as the entire seal member but also lowering the rigidity of the angular portion as the temperature of the operating oil rises, and always securing the stable damping characteristic while well maintaining the sealing performance at a high temperature.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Preferred embodiments of the present invention will be described hereinafter with reference to the accompanying drawings.

Figure 1:
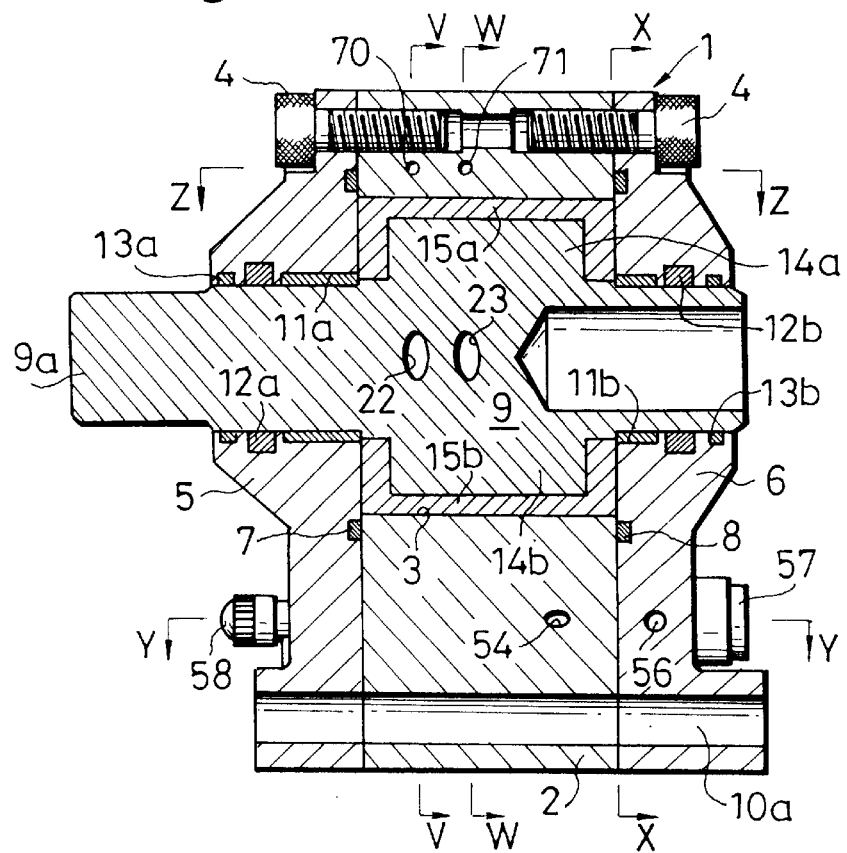
FIG. 1 is a longitudinal front view showing a rotary damper according to one embodiment of the present invention.
Figure 2:
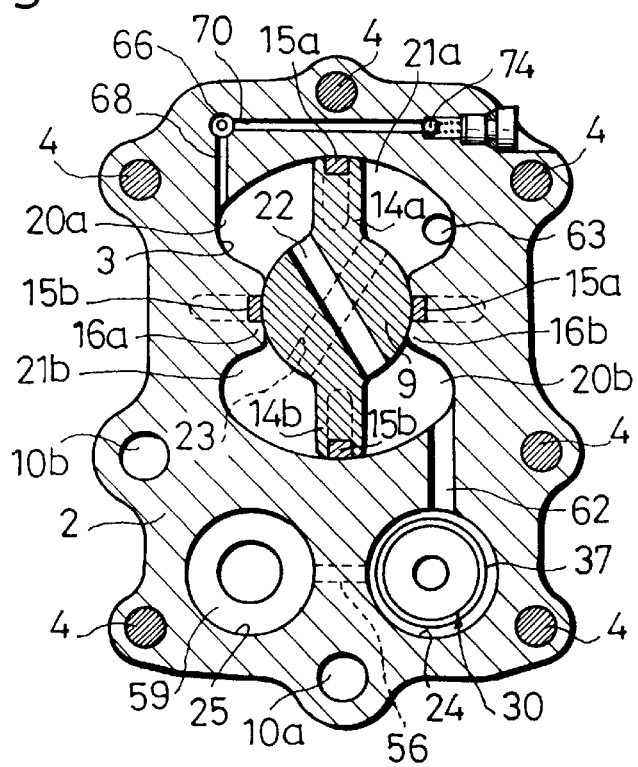
FIG. 2 is a longitudinal side view taken on line V—V of FIG. 1.

Referring to FIGS. 1 and 2, a housing 2 forming a casing 1 of a rotary damper is formed with a bore 3 axially extending therethrough.

Opposite ends of the bore 3 are closed through seals 7 and 8 by left and right panels 5 and 6 mounted on both sides of the housing 2 by bolts 4. The housing 2 and the side panels 5, 6 constitute the casing 1 of the rotary damper.

In the center of the bore 3 is rotatably inserted a rotor 9 extending through the left and right side panels 5 and 6. The rotor 9 has one end extending from the left side panel 5 toward the outside to shape a mounting portion 9a connected, for example, to the unsprung side of a vehicle body not shown through a link or the like.

The casing 1 is further formed with mounting holes 10a and 10b as other mounting portions. The casing 1 is mounted, for example, to the sprung side of the vehicle body not shown while inserting through-bolts into the mounting holes 10a and 10b to connect the housing 2 and the left and right side panels 5 and 6.

The rotor 9 is rotatably center-supported by bearings 11a and 11b provided on the side panels 5 and 6, and are sealed by oil seals 12a and 12b and dust seals 13a and 13b.

Two vanes 14a and 14b axially deviated in phase by 180 degrees are formed on the outer peripheral surface of a portion positioned within the bore 3 of the rotor 9.

The vanes 14a and 14b are in contact with the inner wall surface of the bore 3 and the inner wall surfaces of the side panels 5 and 6 through seal members 15a and 15b interposed over the extreme end surface and both sides, and are in sliding contact therewith for maintaining these contact portions in an oil-tight state.

Two separating blocks 16a and 16b likewise axially deviated in phase by 180 degrees are formed, facing the vanes 14a and 14b of the rotor 9, on the inner wall of the bore 3 of the housing 2.

The separating blocks 16a and 16b on the bore 3 side are also provided with the same seal members 15a and 15b as the seal members 15a and 15b of the vanes 14a and 14b previously mentioned, over the both sides from the extreme end surface and come in contact with the outer peripheral surface of the rotor 9 and the inner wall surfaces of the side panels 5 and 6, with the seal members 15a and 15b maintaining these contact portions in an oil-tight state.

Figure 3:
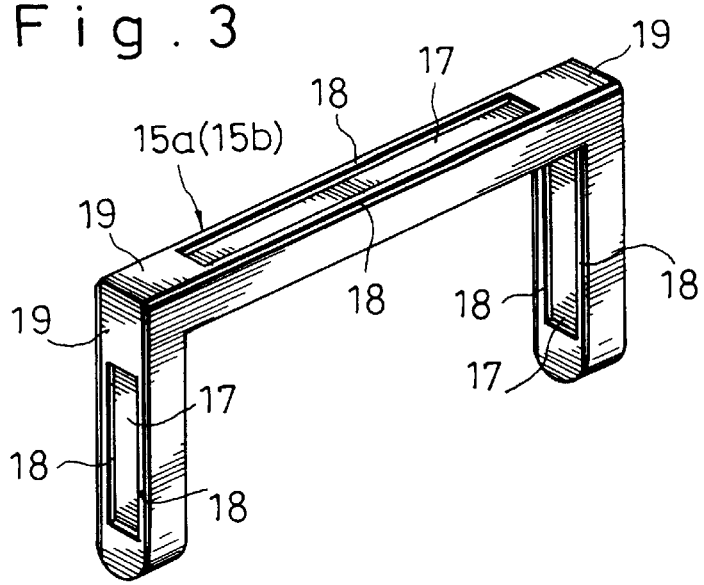
FIG. 3 is an enlarged perspective view of a seal member interposed between a separating block and an outer peripheral surface of a vane.
Figure 4:
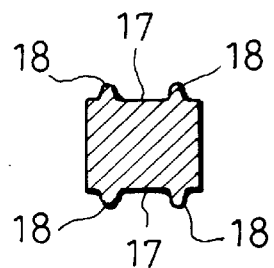
FIG. 4 is a sectional view with the seal member longitudinally sectioned at a protruding lip portion.

The seal members 15a and 15b have their extreme end portions and both side portions integrally formed, as can be seen in FIGS. 3 and 4, and concave portions 17 are formed in the inner and outer surfaces of the these extreme end portions and both side portions.

Ridge edge portions before and behind of the extreme end portions and both side portions are formed to be lower than the extreme end surfaces and both sides over the entire area to form projecting lips 18 therebetween with the concave portions 17.

Alternatively, a plurality of the projecting lips 18 may be formed by defining the concave portions 17 in a longitudinal direction so that these defined portions serve as the projecting lips to increase the number thereof.

Figure 5:
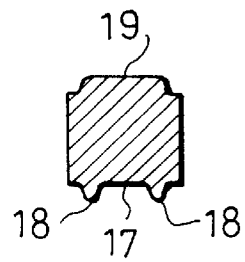
FIG. 5 is a sectional view likewise with the seal member longitudinally sectioned at an angular portion.
Figure 6:
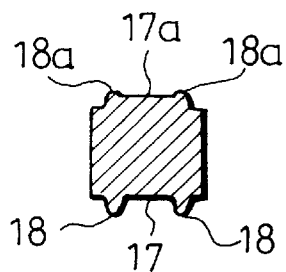
FIG. 6 is a sectional view with a seal member according to a further embodiment longitudinally sectioned at an angular portion.

Angular portions on the outer surface sides of the concave portions 17 in the extreme end portions and both sides are buried to the same level as the projecting lips 18 to form a flat surface 19 as shown in FIG. 5 or to form a concave portion 17a shallower than the portion of the concave portion 17 slightly leaving projecting lips 18a as shown in FIG. 6, which are placed upon mating members through the projecting lips 18 and the flat surface 19 or the projecting lips 18 and 18a with a difference in height so as to carry out a sealing function as the seal members 15a and 15b.

Thereby, the interior of the bore 3 in the casing 1 is defined, while maintaining the oil-tight state, into two sets of operating oil chambers 20a and 20b and operating oil chambers 21a and 21b (see FIG. 2) which alternately repeat the contraction and expansion as the casing 1 and the rotor 9 performs their relative rotational motion by the vanes 14a and 14b and the separating blocks 16a and 16b.

Turning again to FIGS. 1 and 2, the operating oil chambers 20a and 20b, and operating oil chambers 21a and 21b, are in communication with each other through oil ports 22 and 23 bored in the rotor 9.

The operating oil chambers 20a, 20b and 21a, 21b are formed thereunder with two bores 24 and 25 transversely extending through the housing 2 so that the former are arranged in a horizontal direction.

Figures 9, 10:
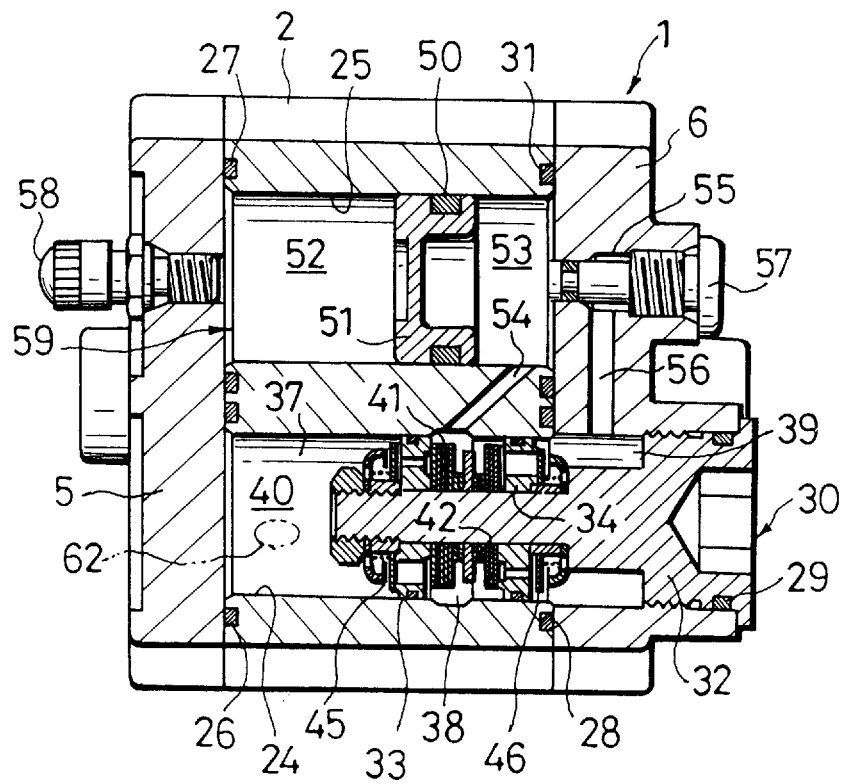
FIG. 9 is likewise a transverse plan view taken on line Y—Y of FIG. 1.
FIG. 10 is a transverse plan view showing in an enlarged scale a portion of a damping force generating mechanism in FIG. 9.

Left open ends of the bores 24 and 25 are closed oil-tightly by the side panel 5 by putting seals 26 and 27 between the housing 2 and the side panel 5, as shown in FIG. 9.

A right open end of the bore 24 is closed oil-tightly by a seal 28 interposed between the housing 2 and the side panel 6, and a double-effective damping force generating mechanism 30 screwed into the side panel 6 from the outside through a seal 29.

A right open end of the bore 25 is directly closed oil-tightly by the side panel 6 by putting a seal 31 between the housing 2 and the side panel 6.

As shown in a partial enlarged view of FIG. 10, in this embodiment the damping force generating mechanism 30 is provided with a guide rod 32 screwed into the right side panel 6 through the seal 29 and two partition walls 33 and 34 fitted in the outer periphery of the guide rod 32.

The partition walls 33 and 34 define three oil chambers 37, 38 and 39 within the bore 24 by seals 35 and 36 interposed in the outer peripheral surface thereof, these oil chambers 37, 38 and 39 form a communication flowpassage 40.

Damping valves 41 and 42 are provided on the surface on the oil chamber 38 side in the partition walls 33 and 34, these damping valves 41 and 42, closing damping channels 43 and 44, are provided in the partition walls 33 and 34, respectively.

Return valves 45 and 46 are provided on the surfaces of the oil chambers 37 and 39 along sides of the partition walls 33 and 34. These return valves 45 and 46 close free channels 47 and 48 provided in the partition walls 33 and 34.

The partition walls 33 and 34, the damping valves 41 and 42 and the return valves 45 and 46 are secured to the guide rod 32 by nuts 49 to form the damping force generating mechanism 30 with the back surfaces of the damping valves 41 and 42 arranged opposite to each other.

Turning again to FIG. 9, a free piston 51 provided with a seal 50 in the outer periphery thereof is slidably inserted into a further bore 25, and the interior of the bore 25 is divided into a gas chamber 52 and an oil chamber 53 by the free piston 51.

The oil chamber 53 is in communication with the oil chamber 38 of the communication flowpassage 40 in the bore 24 through an oil passage 54 bored in the housing 2 and also in communication with an oil chamber 39 of the communication flowpassage 40 through a lubricating port 55 provided in the side panel 6 and a side oil passage 56.

The lubricating port 55 is normally closed by a cut plug 57 screwed into the side panel 6 from the outside. The cut plug 57 cutting off the communication between the lubricating port 55 and the side oil passage 56 in this state.

The right side panel 5 is provided with a gas feed/discharge valve 58 toward the gas chamber 52 whereby the interior of the bore 25 constitutes a temperature compensation mechanism 59.

In this manner, the oil chamber 53 in the temperature compensation mechanism 59 communicates with the oil chamber 38 on the back sides of the damping valves 41 and 42 in the damping force generating mechanism 30 provided in the communication flowpassage 40 and also communicates with the oil chamber 39 of the communication flowpassage 40 through the side oil passage 56 from the lubricating port 55 by removing the cut plug 57 when the rotary damper is lubricated.

Figure 14:
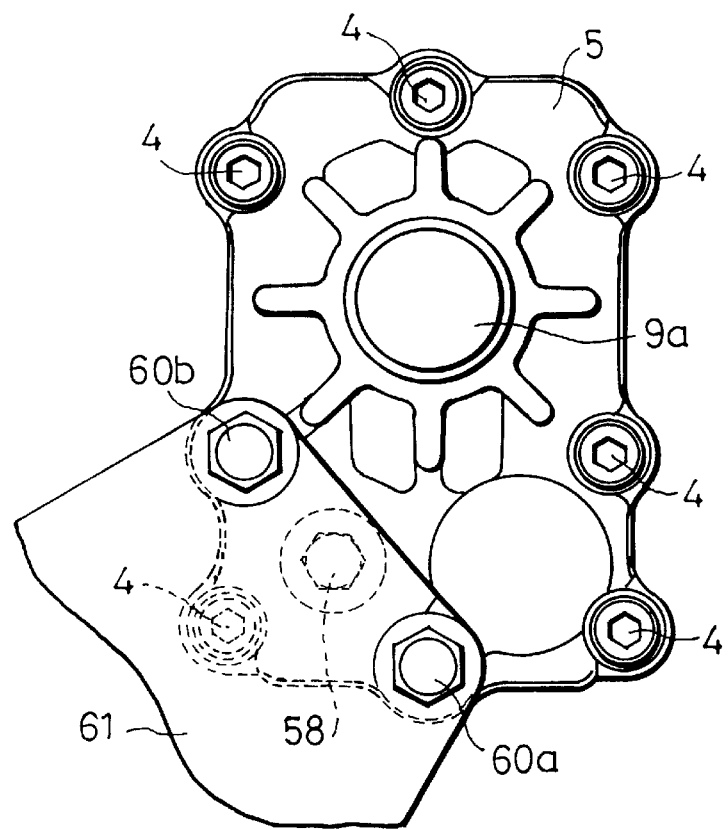
FIG. 14 is a side view showing the construction of mounting a rotary damper to a vehicle.

It is noted from the foregoing that the rotary damper is not directly mounted on the spring side of the vehicle body by the through-bolts using the mounting holes 10a and 10b of the housing 2 as previously mentioned but as shown in FIG. 14, a connection panel 61 is mounted in advance on the rotary damper by through-bolts 60a and 60b and the rotary damper is mounted on the spring side of the vehicle body through the connection panel 61.

By doing so, the connection panel 61 covers the cut plug 57 for lubrication of operating oil and the gas feed/discharge valve 58 of the temperature compensation mechanism 59 to prevent the cut plug 57 from being erroneously loosened or the gas feed/discharge valve 58 from being broken by a stepping stone or the like.

On the other hand, one set of the operating oil chambers 20a and 20b communicate with each other by the oil port 22 and are in communication with the oil chamber 37 of the communication flowpassage 40 in the bore 24 by an oil passage 62 formed in the housing 2 in a longitudinal direction downwardly from the stroke end on the contraction side of the operating oil chamber 20b, as will be apparent from FIGS. 2 and 9.

Figure 8:
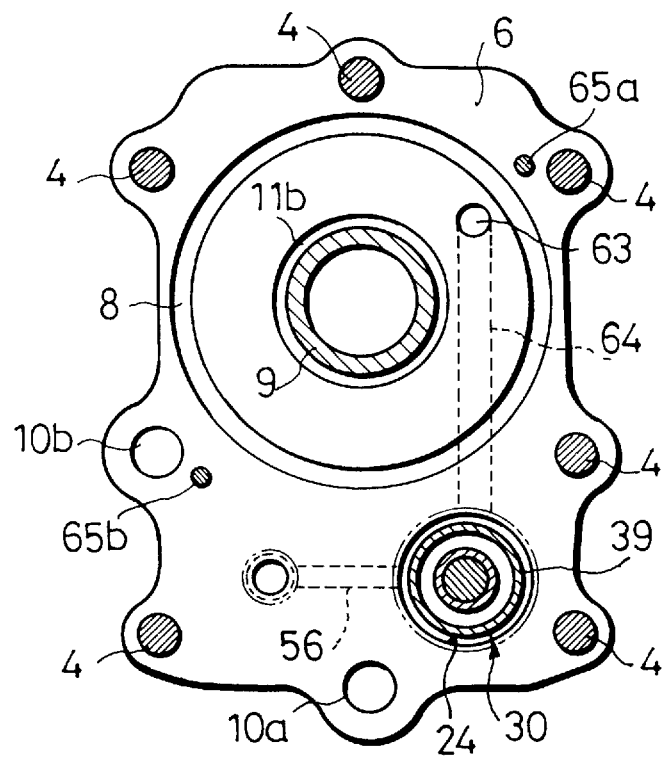
FIG. 8 is likewise a longitudinal side view taken on line X—X of FIG. 1 and is a side view showing a right side panel as viewed from the inner wall side thereof.

Further, the other set of operating oil chambers 21a and 21b communicate with each other by the oil port 23 and are likewise in communication with the oil chamber 39 of the communication flowpassage 40 in the bore 24 through a longitudinal hole 64 provided in the side panel 6 from a lateral hole 63 bored in the right side panel 6 opening to the stroke end on the contraction side of the operating oil chamber 21a, as will be apparent from FIGS. 2 and 8.

With this, two sets of the operating oil chambers 20a and 20b and the operating oil chambers 21a and 21b alternately subjected to contraction and expansion as the casing 1 and the rotor 9 perform their relative rotational motion are mutually in communication through the damping force generating mechanism 30 by the communication flowpassage 40 through the oil passage 62 leading to the operating oil chamber 20a, and the lateral hole 63 and longitudinal hole 64 leading to the operating oil chamber 21b.

Pins 65a and 65b shown in FIG. 8 are indexing dowel pins interposed between the housing 2 and the side panel 6.

Needless to say, similar dowel pins are provided between the housing 2 and the side panel 5, though particularly not shown.

Figure 7:
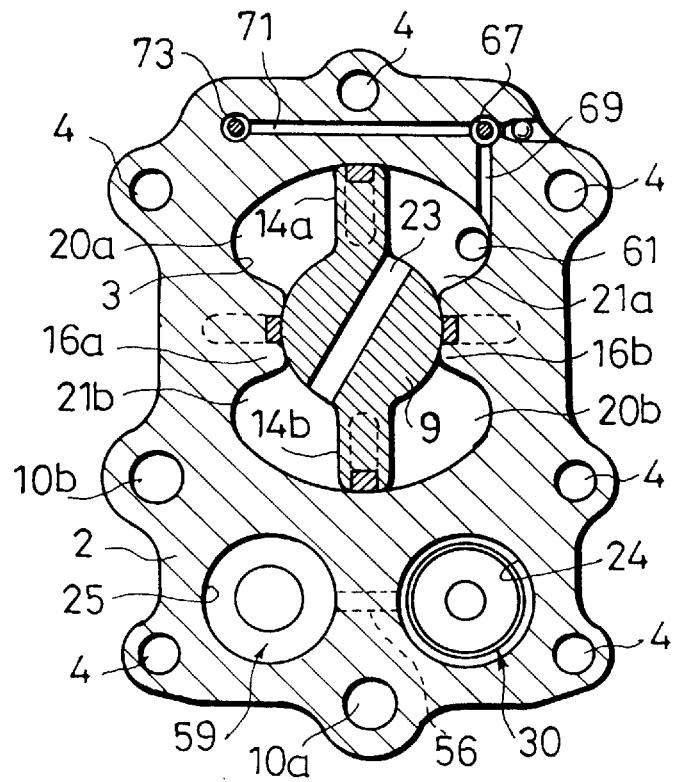
FIG. 7 is a longitudinal side view taken on line W—W of FIG. 1.

In FIGS. 2 and 7, oil passages 68 and 69 extend from the stroke end on the contraction sides of the operating oil chambers 20a and 21a in the housing 2 towards oil chambers 66 and 67 provided at the upper part, the oil passage 68 communicating the operating oil chamber 20a and the oil chamber 66 each other, the oil passage 69 communicating the operating oil chamber 21a and the oil chamber 67 each other.

Figure 11:
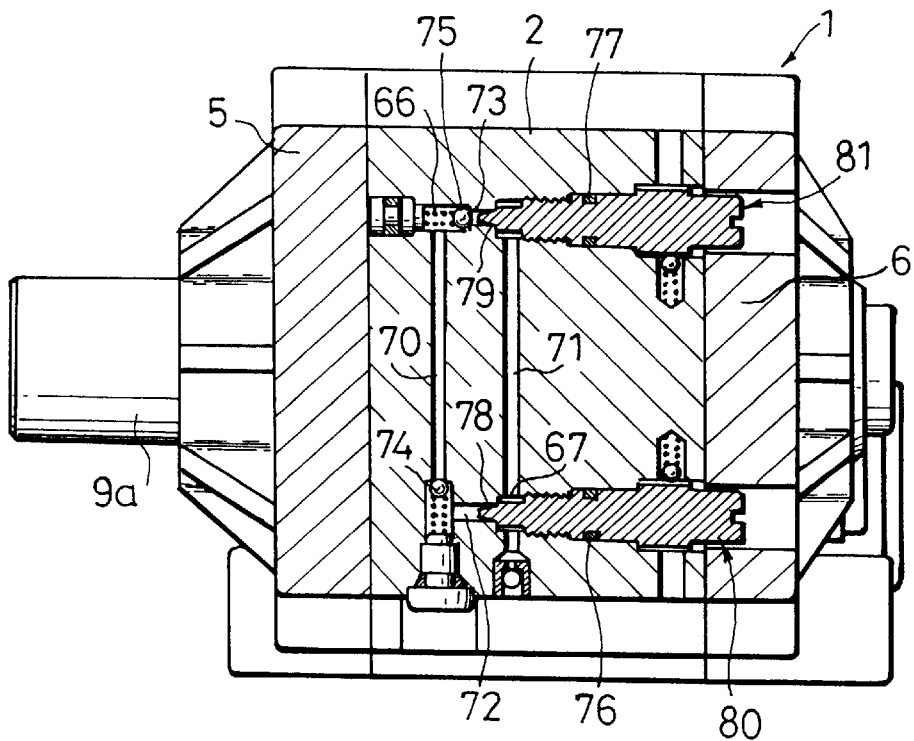
FIG. 11 is a sectional view taken on line Z—Z of FIG. 1 and is a transverse plan view showing a portion of a damping force adjusting mechanism.

The oil chambers 66 and 67 are communicated in the form of a box by longitudinally and latitudely parallel oil passages 70 and 71 and oil passages 72 and 73, as shown in a sectional view of FIG. 11, to allow only the flow of the operating oil counterclockwise (in FIG. 11) by check valves 74 and 75 provided in the middle of oil passages 70 and 73.

Throttle valves 78 and 79 are threadedly inserted towards an outlet of the oil passage 72 and an inlet of the oil passage 73 while maintaining oil-tightness by seals 76 and 77 from the outside of the housing 2. These throttle valves 78 and 79 form damping force adjusting mechanisms 80 and 81 for variably controlling a flow resistance of an operating oil flowing through the oil passages 70, 71, 72 and 73.

Thereby, the oil passages 68 and 69 cooperate with the oil passages 70, 71, 72 and 73, the check valves 74 and 75 and the throttle valves 78 and 79 to form, with respect to a main flowpassage of an operating oil flowing through the communication flowpassage previously mentioned, a bypass flowpassage for mutually communicating the operating oil chambers 20a and 20b and the operating oil chambers 21a and 21b through the damping force adjusting mechanisms 80 and 81 composed of the throttle valves 78 and 79, while bypassing the main flowpassage.

The operation of the rotary damper according to the embodiment of the present invention constructed as described above will be explained hereinafter.

First, when the operating oil is lubricated into the assembled rotary damper, the cut plug 57 is removed from outside to open the lubricating port 55 and to open the side oil passage 56 also at the same time.

In this state, a lubricating nozzle is inserted into the rotary damper from the lubricating port 55, and air in the rotary damper is first released while holding and indexing the free piston 51 in the temperature compensation mechanism 59 by the extreme end of the lubricating nozzle.

Thereafter, the lubrication of the operating oil into the rotary damper will be carried out through the lubricating nozzle as follows.

The operating oil supplied from the lubricating nozzle is supplied to the oil chamber 38 of the communication flowpassage 40 through the oil passage 54 while being filled in the oil chamber 53 in the temperature compensation mechanism 59, and is also supplied to the oil chamber 39 of the communication flowpassage 40 from the side oil passage 56.

The operating oil supplied from the oil passage 54 to the oil chamber 38 of the communication flowpassage 40 flows into the oil chamber 37 while opening the return valve 45 through the free channel 47 of the damping force generating mechanism 30, from which the operating oil flows into the operating oil chamber 20a through the oil passage 62 and is also supplied to the operating oil chamber 20b through the oil port 22 of the rotor 9.

The operating oil supplied from the side oil passage 56 to the oil chamber 39 flows into the operating oil chamber 21a in the casing 1 through the longitudinal hole 64 and the lateral hole 63 of the side panel 6, from which the operating oil is supplied to the operating oil chamber 21b through the oil port 23 of the rotor 9.

With this, various parts in the rotary damper are filled with the operating oil supplied from the lubricating nozzle.

Thereafter, the lubricating port 55 is closed by the cut plug 57 when the rotary damper is filled with the operating oil, and at the same time, the side oil passage 56 is also closed by the cut plug 57 whereby the oil chamber 53 of the temperature compensation mechanism 59 is in communication with only the oil chamber 38 of the communication flowpassage 40 by the oil passage 54.

In this manner, in the lubricating operation, the operating oil supplied from the lubricating nozzle is supplied to various parts in the rotary damper rarely being subjected to the flow resistance through the oil passage 54 and the side oil passage 56, and the lubricating operation is completed in a short period of time and positively to quicken the lubricating operation.

On the other hand, in the case where the rotary damper is operated under the external force from this state, the relative rotational motion occurs between the casing 1 and the rotor 9 so that one set of the operating oil chambers 20a and 20b and the other set of the operating oil chamber 21a and 21b alternately repeat their contraction and expansion.

Supposing now that the rotary damper is operated in the direction of expanding the other set of the operating oil chambers 21a and 21b while contracting one set of the operating oil chambers 20a and 20b, the operating oil in the contracted set of the operating oil chambers 20a and 20b tends to be extruded into the oil chamber 37 of the communication flowpassage 40 through the oil passage 62.

Moreover, at the same time, the operating oil in the operating oil chambers 20a and 20b flows from the oil passage 68 into the expanded set of operating oil chambers 21a and 21b through a bypass flowpassage comprising the oil chamber 66, the oil passage 70, the check valve 74, the oil passage 72, the throttle valve 78 of the damping force adjusting mechanism 80, the oil chamber 67 and the oil passage 69.

At this time, the operating oil passing through the bypass flowpassage is subjected to the flow resistance by the throttle valve 78 of the damping force adjusting mechanism 80 and flows into the expanded set of the operating oil chambers 21a and 21b while generating the damping force according to the flow resistance.

The operating oil having been extruded into the oil chamber 37 of the communication flowpassage 40 forcibly opens, only when the pressure of the operating oil exceeds the cracking pressure of the damping valve 41 in the damping force generating mechanism 30, the damping valve 41 through the damping channel 43 of the partition wall 33 from the oil chamber 37 and flows into the oil chamber 38 while generating the damping force by the flow resistance when the operating oil flows with the damping valve 41 forcibly opened, and further flows into the oil chamber 39 from the free channel 48 of the partition wall 34 with the return valve 46 opened.

Then, the operating oil flows from the oil chamber 39 into the expanded set of the operating oil chambers 21a and 21b through the longitudinal hole 64 and the lateral hole 63 of the side panel 6, and a shortage of the operating oil in the expanded operating oil chambers 21a and 21b is replenished together with the operating oil from the above-described bypass flowpassage.

As a result, the damping characteristic when the above-described rotary damper is operated is determined by the Dow resistance when the operating oil flows through the throttle valve 78 of the damping force adjusting mechanism 80 and the damping valve 41 in the damping force generating mechanism 30.

Supposing now that the rotary damper effects the rotational motion in the direction opposite to that of the above to contract the other set of the operating oil chambers 21a and 21b while expanding the one set of operating oil chambers 20a and 20b. In this case, the operating oil in the contracted operating oil chambers 21a and 21b tends to be extruded into the oil chamber 39 of the communication flowpassage 40 through the longitudinal hole 64 from the lateral hole 64.

Moreover, at this time, the operating oil in the operating oil chambers 20a and 20b flows from the oil passage 69 into the expanded set of the operating oil chambers 20a and 20b through a bypass flowpassage comprising the oil chamber 67, the oil passage 71, the throttle valve 79 of the damping force adjusting mechanism 81, the oil passage 73, the check valve 75, the oil chamber 66 and the oil passage 68.

At this time, the operating oil passing through the above-described bypass flowpassage is subjected to flow resistance by the throttle valve 9 of the damping force adjusting mechanism 81 and flows into the expanded set of the operating oil chambers 20a and 20b while generating the damping force according to the flow resistance.

The operating oil having been extruded into the oil chamber 39 of the communication flowpassage 40 forcibly opens, only when the pressure of the operating oil exceeds the cracking pressure of the damping valve 42 in the damping force generating mechanism 30, the damping valve 42 through the damping channel 44 of the partition wall 34 from the oil chamber 39 and flows into the oil chamber 37 while generating the damping force by the flow resistance when the operating oil flows with the damping valve 42 forcibly opened, and further flows into the oil chamber 37 from the free channel 47 of the partition wall 33 with the return valve 45 opened.

Then, the operating oil flows from the oil chamber 37 into the expanded set of operating oil chambers 20a and 20b through the oil passage 62 bored in the housing 2, and a shortage of the operating oil in the expanded operating oil chambers 20a and 20b is replenished together with the operating oil from the above-described bypass flowpassage.

Accordingly, the damping characteristic in the case where the above-described rotary damper is operated is also determined by the flow resistance in the case where the operating oil flows through the throttle valve 79 of the damping force adjusting mechanism 81 and the damping valve 42 in the damping force generating mechanism 30.

From the foregoing, the characteristics of the damping valves 41 and 42 in the damping force generating mechanism 30 are used properly according to the operating direction of the rotary damper whereby the respective damping characteristics can be set individually and appropriately according to the operating direction of the rotary damper.

Moreover, not only the former but in any of these cases, damping force adjusting mechanisms are operated from the outside to adjust the flow resistance of the operating oil passing through the throttle valves 78 and 79 to adjust the damping characteristics set in the damping valves 41 and 42 of the damping force generating mechanism 30, whereby the damping characteristics according to the operating direction of the rotary damper can be independently adjusted, respectively.

However, if when the rotary damper is operated, the operating oil leaks through a clearance between the separating blocks 16a and 16b and the vanes 14a and 14b, the flow rate of the operating oil passing through the damping force generating mechanism 30 and the damping force adjusting mechanisms 80 and 81 reduces by a leaked portion, and thereby an unevenness occurs in the damping characteristic.

To prevent this, the seal members 15a and 15b are fitted in the outer peripheral surfaces of the vanes 14a and 14b and the separating blocks 16a and 16b. However, when the dynamic friction of the seal members 15a and 15b is large, not only the smooth operation of the rotary damper is impaired but also the damping characteristic is disturbed.

Thus, in the inner and outer peripheral surfaces of the seal members 15a and 15b, the concave portions 17 are formed in the inner and outer peripheral surfaces of the extreme end portion and both side portions leaving the ends of both side portions, and the ridge edge portions are shaped to be lower to form the projecting lips 18 in a longitudinal direction, which are placed upon the mating members through the projecting lips 18 to lower the friction.

However, this is not sufficient, because the projecting lips 18 at the angular portions of the seal member 15a and 15b are locally high in surface pressure by an interference resulting from both the extreme end and the side surface so that the abrasion of the angular portion increases as compared with that of other portions to lower the durability of the seal members 15a and 15b.

Further, the seal members 15a and 15b are generally formed of a material such as a rubber rich in elasticity. Therefore, when a temperature of the operating oil rises as the rotary damper operates, the seal members 15a and 15b lower in rigidity and tend to be deformed due to the pressure of the operating oil and are inferior in sealing properties at the time of high temperature.

In this respect, the concave portion 17 at the angular portions of the outer peripheral surface is buried to the same level as that of the projecting lips 18 to form the flat surface 19. Alternatively, according to the seal members 15a and 15b in which the concave portion 17a in the aforesaid portion is made to be shallower than the other concave portions 17 to form a lower projecting lip, the angular portions come into contact with the mating surfaces with a larger area than the other portions so that an increase in local surface pressure is suppressed and the abrasion at the angular portions is reduced minimumly affecting on the operability as the rotary damper and improving the durability as the entire seal member.

Moreover, in addition to the above, the lowering of the rigidity of these angular portions as the temperature of the operating oil rises is decreased, and the sealing properties are well maintained even at a high temperature to always assure the stable damping characteristic.

On the other hand, if a situation should occur in which in the flow of the operating oil when the rotary damper is operated, a part of the operating oil flows into the oil chamber 53 of the temperature compensation mechanism 59, the quantity of the operating oil supplied to the expanded operating oil chambers 20a and 20b or the operating oil chambers 21a and 21b is insufficient producing a vacuum and the damping characteristic at the initial time when the rotary damper is inverted later is disturbed.

This can be prevented by imparting the drawing resistance to the oil passage 54 leading to the oil chamber 53 of the temperature compensation mechanism 59 so as to minimize the quantity of the operating oil which tends to flow into the oil chamber 53.

Even employing the above-described procedure, the quantity of operating oil flowing into the oil chamber 53 cannot be made zero, thus making it possible to prevent the operating oil chambers on the expanded side from being in vacuum and failing to assure the initial damping characteristic when the rotary damper is inverted to a desired value.

Moreover, at the time of the lubricating operation of the rotary damper, the flow of operating oil is impaired by the drawing resistance, posing a problem of productivity in that it takes a long time for the lubricating operation which lowers the working efficiency.

On the other hand, in the present embodiment, the operating oil flowing through the portion of the oil chamber 38 in the communication flowpassage 40 is the operating oil after having passed through the damping valves 41 and 42 of the damping force generating mechanism 30 even when the rotary damper is operated in either direction.

For this reason, the pressure of the operating oil in the oil chamber 38 is always maintained at a lower pressure state. Therefore, even if the oil chamber 38 is directly communicated with the oil chamber 53 of the temperature compensation mechanism 59 without imparting the drawing resistance to the oil passage 54, the operating oil in the oil chamber 38 never flows into the oil chamber 53 of the temperature compensation mechanism 59.

As a result, the temperature compensation mechanism 59 does not impair its original function of compensating for surpluses and deficiencies of the operating oil as the temperature changes and provides the stabilization of the temperature characteristic as the rotary damper.

Moreover, in the lubricating operation into the rotary damper, the operating oil flows into the oil chamber 38 of the communication oil passage 40 of the rotary damper with little if any resistance through the oil passage 54, as described above, and the lubricating operation of the operating oil can be carried out easily and in a short period of time.

Figure 12:
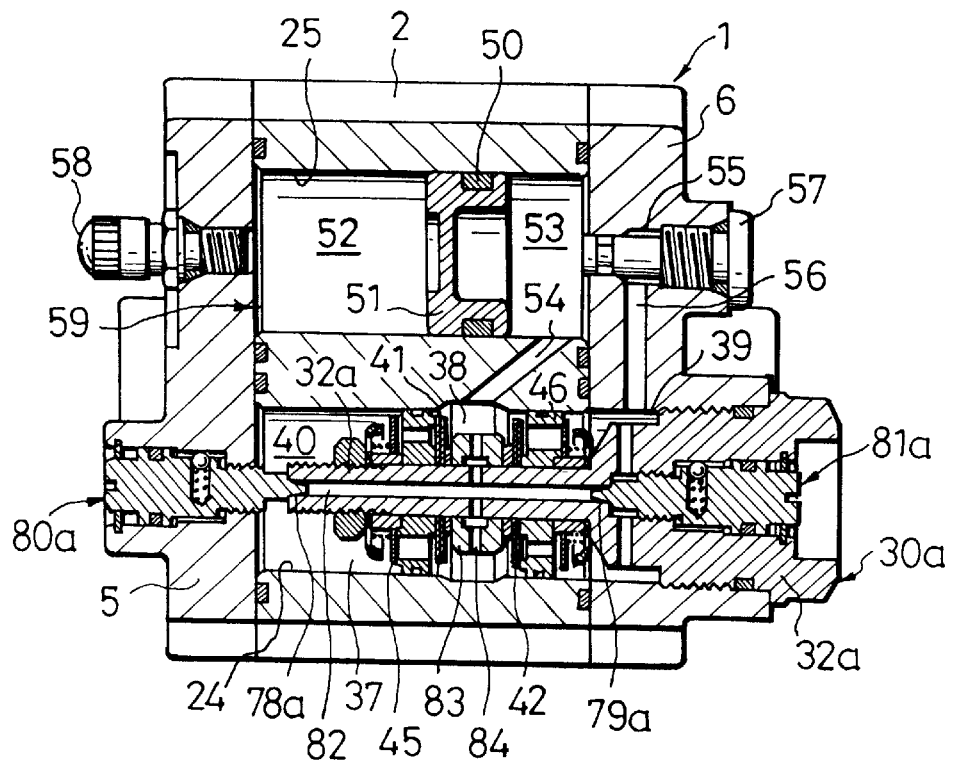
FIG. 12 is a transverse plan view of a portion equal to that shown in FIG. 9 showing another embodiment in the case where the damping force adjusting mechanism is incorporated in the damping force generating mechanism.

While in the first embodiment of the present invention so far described, the damping force generating mechanism 30 and the damping force adjusting mechanisms 80 and 81 are separately provided on the housing 2 side, it is to be noted that these damping force adjusting mechanisms 80 and 81 may be integrally incorporated into the damping force generating mechanism 30 as in the second embodiment shown in FIG. 12.

More specifically, in the second embodiment shown in FIG. 12, a guide rod 32a of a damping force generating mechanism 30a is provided with an oil passage 82 for communicating an oil chamber 37 and an oil chamber 39 of the communication flowpassage 40 with each other to form a bypass flowpassage, and the middle of the oil passage 82 as the bypass flowpassage is communicated with the oil chamber 38 of the communication flowpassage 40 through an oil port 84 of a spacer 83 interposed between the damping valves 41 and 42.

Throttle valves 78a and 79a are threadedly inserted into the side panel 5 and the guide rod 29, respectively, from the left and right toward the bypass flowpassage constituted by the oil passage 82. Damping force adjusting mechanisms 80a and 81a for variably controlling the flow resistance of the operating oil from both sides of the oil passage 82 toward the oil chamber 38 of the communication passage 40 through the oil port 84 are formed by the throttle valves 78a and 79a.

By doing so, the main flow of the operating oil passing through the communication flowpassage 40 when the rotary damper is operated flows through the damping valve 41 and the return valve 46 or the damping valve 42 and the return valve 45 in the damping force generating mechanism 30a, and accordingly, this is the same as the first embodiment.

On the other hand, the flow of the operating oil passing through the throttle valves 78a and 79a of the damping force adjusting mechanisms 80a and 81a flows, when the operating oil chambers 20a and 20b are on the contracted side, from the oil chamber 37 into the oil chamber 38 passing through the throttle valve 78a and through the oil passage 82 of the guide rod 32a and the oil port 84 of the spacer 83.

The above flow joins with the operating oil of the main flow having flowed with the damping valve 41 forced opened at the oil chamber 38 and is fed to the operating oil chambers 21a and 21b on the expanded side with the return valve 46 opened to replenish a short of the operating oil which tends to occur in the operating oil chambers 21a and 21b.

Further, the above flow joins with the operating oil of the main flow which, when the operating oil chambers 21a and 21b are on the contracted side, has flowed from the oil chamber 39 into the oil chamber 38 through the throttle valve 79a, the oil passage 82 and the oil port 84 and then flows with the damping valve 42 forcibly opened, and is fed to the operating oil chambers 20a and 20b on the expanded side while opening the return valve 45 to replenish a deficiency of the operating oil which occurs in the operating oil chambers 20a and 20b in a manner similar to the first embodiment previously shown in FIG. 1.

It would be understood from the foregoing that even if the damping force adjusting mechanisms 80a and 81a are integrally incorporated into the damping force generating mechanism 30a as in the first embodiment shown in FIG. 12, the function similar to that of the previous embodiment can be exhibited.

In any of the first and second embodiments so far mentioned, two sets of damping elements composed of the damping valves 41 and 42 and the return valves 45 and 46 are mounted on the common guide rod 32 or 32a to form the damping force generating mechanisms 30 and 30a, and the damping force generating mechanisms 30 or 30a are integrally screwed into the left and right side panels 6 and disposed in the communication flowpassage 40.

However, these two sets of damping elements are not always formed as an integral configuration but these may be separated and disposed in the communication flowpassage 40. This is not different in function from the aforementioned embodiments.

Figure 13:
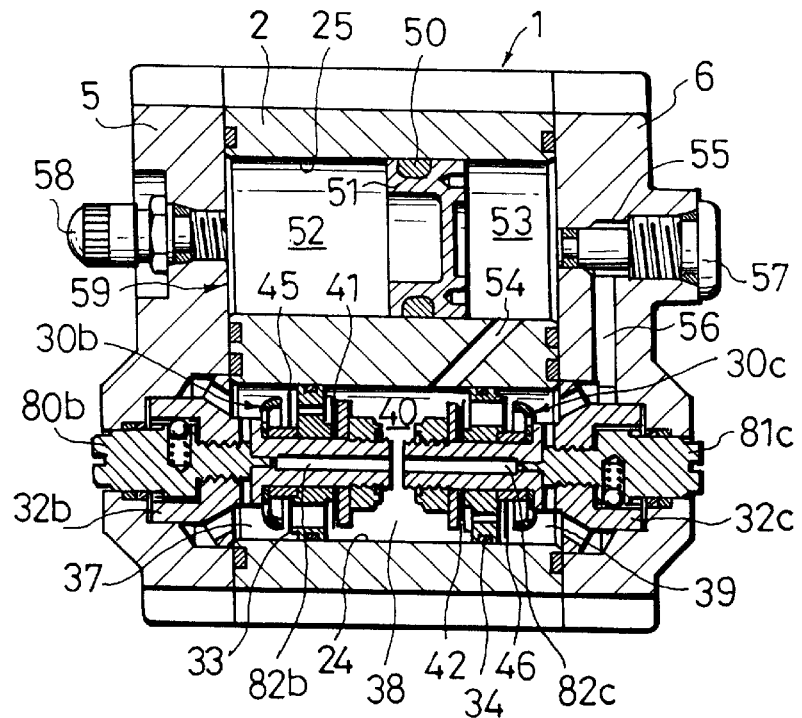
FIG. 13 is likewise a transverse plan view of a portion equal to that shown in FIG. 9 showing another embodiment of the damping force generating mechanism and the damping force adjusting mechanism.

FIG. 13 shows a further concrete embodiment, in which the guide rod is divided into two independent guide rods 32b and 32c, which are oppositely arranged in the communication flowpassage 40 with these, sandwiched between the housing 2 and the left and right side panels 5 and 6.

The damping valve 41 and the return valve 45 with the partition wall 33 put therebetween and the other damping valve 42 and the return valve 46 with the partition wall 34 put therebetween are fitted in advance on the guide rod 32b and the guide rod 32c, respectively, so that the back sides of the damping valves 41 and 42 are opposed to each other, and the damping force generating mechanism is formed by two separated damping force generating mechanisms 30b and 30c.

However, in the above-described construction, the width of the oil chamber 37 in the communication flowpassage 40 is narrow. It is therefore difficult to provide the oil passage 62 (see FIG. 2) for communicating the operating oil chamber 20a and 20b with the oil chamber 37 in the housing 2.

However, this can be solved by boring a lateral hole and a longitudinal hole (not shown) in the left side panel 5 similarly to the lateral hole 63 and the longitudinal hole 64 (see FIG. 8) bored in the right side panel 6 for connecting the operating oil chambers 21a and 21b to the right oil chamber 39 of the communication flowpassage 40.

With this, even if the damping force generating mechanism is constituted by two separated damping force generating mechanisms 30b and 30c, the damping force generating mechanisms 30b and 30c are oppositely disposed, in the form of a set, in the communication flowpassage 40, and the interior of the communication flowpassage 40 is defined into three oil chambers 37, 38 and 39 by the damping force generating mechanisms 30b and 30c.

It is to be noted from the foregoing that similarly to the damping force generating mechanisms 30 and 30a in the aforementioned embodiments, not only can the damping characteristic be set individually and appropriately by the damping force generating mechanisms 30b and 30c according to the operating direction of the rotary damper, but also the oil chamber 38 in the communication flowpassage 40 is communicated with the oil chamber 53 of the temperature compensation mechanism 50 by the oil passage 54 to thereby quicken the lubricating operation and stabilize the damping characteristic and the temperature characteristic during the operation of the rotary damper.

While in the above-described third embodiment shown in FIG. 13, the guide rods 32b and 32c are bored with the oil passages 82b and 82c for the bypass flowpassage for communicating the oil chamber 37 and the oil chamber 38, and the oil chamber 38 and the oil chamber 39 in the communication flowpassage 40 with each other, and the damping force adjusting mechanisms 80b and 81c are mounted on the oil passages 82b and 82c from the left and right sides, similarly to the second embodiment shown in FIG. 12, it is to be noted that the damping force adjusting mechanisms 80b and 81c may be provided on the housing 2 side similar to the first embodiment.

As described above, according to the present invention, two sets of damping force generating mechanisms are oppositely arranged in one of two bores disposed in parallel in the casing, the other bore being a temperature compensation mechanism, and the back surfaces of said two sets of damping force generating mechanisms are in communication with the oil chamber of the temperature compensation mechanism by the oil passage. With this, in the normal operation of the rotary damper, it is possible to positively prevent the operating oil flowing through the damping force generating mechanism from flowing into the oil chamber of the temperature compensation mechanism from the oil passage.

As a result the rotary damper provides the stabilization of the damping characteristic and the temperature characteristic without impairing the original function, as the temperature compensation mechanism, is small in size and light in weight, can be easily mounted on the vehicle, and can be easily manufactured at less cost.

The lubricating port is provided with a side oil passage leading to one set of operating oil chambers, and the lubricating port and the side oil passage can be simultaneously closed by a cut plug. With this, the operating oil fed into the oil chamber of the temperature compensation mechanism through the lubricating port can be supplied not only from the oil passage to one operating oil chamber through the free channel in the damping force generating mechanism but also can be supplied to the other set of operating oil chambers through the side oil passage.

Accordingly, in the lubricating operation to the rotary damper, the operating oil fed from the lubricating port quickly flows into various parts of the rotary damper and subjected to little if any resistance. Thus, the lubricating operation of the operating oil can be accomplished easily, in a short period of time and efficiently.

Further, a plurality of projecting lips are formed in a longitudinal direction of the inner and outer peripheral surfaces of seal members provided on separating blocks and vanes. Out of concave portions formed therebetween by the projecting lips, the concave portions at angular portions on the outer peripheral surface are buried to form a flat surface, or the depth of one concave portion is formed to be shallower than that of the other concave portion to make the height of the projecting lips in the portion lower whereby increasing the rigidity in the angular portion of the outer peripheral surface. With this, it is possible to suppress an increase in local contact surface pressure at the angular portion to improve the wear resistance and the durability as the seal member.

In addition to the above, the lowering of the rigidity at the angular portion as a temperature of the operating oil rises is small so that even at a high temperature, the sealing properties can be well maintained to always assure the stable damping force characteristic.

While specific embodiments of the invention have been shown and described in detail to illustrate the application of the principles of the invention, it will be understood that the invention may be embodied otherwise without departing from such principles.

What is claimed is:

1. A rotary damper comprising:
   two operating oil chambers which alternately repeat contraction and expansion as a casing and a rotor rotatably displace are communicated with each other by a communication flowpassage, a damping force generating mechanism is disposed in the midst of said communication flowpassage to impart a fixed damping resistance with respect to each flow direction, and a temperature compensation mechanism is communicated with said communication flowpassage so as to compensate for changes in a volume of an operating oil as a temperature of said operating oil changes, characterized in that a bore for said damping force generating mechanism as a single communication flowpassage and a bore for said temperature compensation mechanism are arranged in a line in the casing, the damping force generating mechanism is divided into two sets of damping elements comprising a damping valve and a return valve, the damping elements are arranged in series in the communication flowpassage in a single guide rod with back surfaces of the damping valves being oppositely fitted, whereas a communication flowpassage portion between the damping valves is communicated with an oil chamber of the temperature compensation mechanism by an oil passage.

2. The rotary damper according to claim 1, wherein bypass flowpassages are provided in the casing which individually bypass the damping elements of the damping force generating mechanism to the other operating oil chamber, and a damping force adjusting mechanism capable of being adjusted externally is disposed in the bypass flowpassage.

3. The rotary damper according to claim 2, wherein the temperature compensation mechanism is provided with a lubricating port, and the lubricating port is opened to the oil chamber of the temperature compensation mechanism and is communicated with one end of the communication flowpassage by a side oil passage, said side oil passage being closed by a closing cut plug.

4. The rotary damper according to claim 1, wherein bypass flowpassages which individually bypass each damping element to the other operating oil chamber are provided in the guide rod of the damping force generating mechanism, and a damping force adjusting mechanism capable of being adjusted externally is disposed in the bypass flowpassage.

5. The rotary damper according to claim 4, wherein the temperature compensation mechanism is provided with a lubricating port, and the lubricating port is opened to the oil chamber of the temperature compensation mechanism and is communicated with one end of the communication flowpassage by a side oil passage, said side oil passage being closed by a closing cut plug.

6. The rotary damper according to claim 1, wherein the temperature compensation mechanism is provided with a lubricating port, and the lubricating port is opened to the oil chamber of the temperature compensation mechanism and is communicated with one end of the communication flowpassage by a side oil passage, said side oil passage being closed by a closing cut plug.

7. A rotary damper comprising:

two operating oil chambers which alternately repeat contraction and expansion as a casing and a rotor rotatably displace are communicated with each other by a communication flowpassage, a damping force generating mechanism is disposed in the midst of said communication flowpassage to impart a fixed damping resistance with respect to each flow direction, and a temperature compensation mechanism is communicated with said communication flowpassage so as to compensate for changes in a volume of an operating oil as a temperature of said operating oil changes, characterized in that said bore for a damping force generating mechanism as a single communication flowpassage and a bore for said temperature compensation mechanism are arranged in a line in the casing, the damping force generating mechanism is divided into two sets of damping elements comprising a damping valve and a return valve, the damping elements are arranged in series in the communication flowpassage in guide rod means with back surfaces of the damping valves being oppositely fitted, whereas a communication flowpassage portion between the damping valves is communicated with an oil chamber of the temperature compensation mechanism by an oil passage.

8. The rotary damper according to claim 7, wherein bypass flowpassages are provided in the casing which individually bypass the damping elements of the damping force generating mechanism to the other operating oil chamber, and a damping force adjusting mechanism capable of being adjusted externally is disposed in the bypass flowpassage.

9. The rotary damper according to claim 7, wherein bypass flowpassages which individually bypass each damping element to the other operating oil chamber are provided in the guide rod of the damping force generating mechanism, and a damping force adjusting mechanism capable of being adjusted externally is disposed in the bypass flowpassage.

10. The rotary damper according to claim 7, wherein the temperature compensation mechanism is provided with a lubricating port, and the lubricating port is opened to the oil chamber of the temperature compensation mechanism and is communicated with one end of the communication flowpassage by a side oil passage, said side oil passage being closed by a closing cut plug.

11. The rotary damper according to claim 7, wherein said guide rod means comprises individual guide rods.

12. The rotary damper according to claim 7, wherein said guide rod means comprises a single guide rod.

13. A rotary damper comprising:

two operating oil chambers which alternately repeat contraction and expansion as a casing and a rotor rotatably displace are communicated with each other by a communication flowpassage, a damping force generating mechanism is disposed in the midst of a said communication flowpassage to impart a fixed damping resistance with respect to each flow direction, and a temperature compensation mechanism is communicated with said communication flowpassage so as to compensate for changes in a volume of an operating oil as a temperature of said operating oil changes, characterized in that seal members are disposed on the outer peripheral surfaces of a separating block extending inwardly from the casing and a vane extending outwardly from the rotor, a plurality of projecting lips are formed on the inner and outer peripheral surfaces of said seal members in a longitudinal direction, and out of concave portions formed by and between the projection lips, a concave portion at an angular portion on the outer peripheral surface is buried to form a flat surface.

14. A rotary damper comprising:

two operating oil chambers which alternately repeat contraction and expansion as a casing and a rotor rotatably displace are communicated with each other by a communication flowpassage, a damping force generating mechanism is disposed in the midst of said communication flowpassage to impart a fixed damping resistance with respect to each flow direction, and a temperature compensation mechanism is communicated with said communication flowpassage so as to compensate for changes in a volume of an operating oil as a temperature of said operating oil changes, characterized in that seal members are disposed on the outer peripheral surfaces of a separating block extending inwardly from the casing and a vane extending outwardly from the rotor, a plurality of projecting lips are formed on the inner and outer peripheral surfaces of said seal members in a longitudinal direction, and out of concave portions formed by and between the projection lips, a concave portion at an angular portion has a depth formed to be shallower than that of concave portions in other portions.

* * * * *